United States Patent
Burr et al.

(10) Patent No.: US 7,509,324 B2
(45) Date of Patent: Mar. 24, 2009

(54) APPARATUS AND METHOD FOR SHARING CONFIGURATION DATA AMONG A PLURALITY OF DEVICES

(75) Inventors: John Ronald Burr, Roanoke, VA (US); Jeffrey Alan Melius, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 10/711,272

(22) Filed: Sep. 7, 2004

(65) Prior Publication Data

US 2006/0053114 A1    Mar. 9, 2006

(51) Int. Cl.
G06F 17/30 (2006.01)

(52) U.S. Cl. .......................... 707/10; 707/1; 707/104.1

(58) Field of Classification Search ................. 707/101, 707/102, 104.1, 201, 203, 104, 1, 10, 100, 707/200; 713/1; 700/1
See application file for complete search history.

(56) References Cited

U.S. PATENT DOCUMENTS

| | | | |
|---|---|---|---|
| 6,014,669 A * | 1/2000 | Slaughter et al. .............. 707/10 |
| 6,169,928 B1 | 1/2001 | Olson et al. | |
| 6,266,713 B1 | 7/2001 | Karanam et al. | |
| 6,449,715 B1 * | 9/2002 | Krivoshein ..................... 713/1 |
| 6,603,488 B2 * | 8/2003 | Humpleman et al. ......... 715/771 |
| 6,715,075 B1 * | 3/2004 | Loukianov ................... 713/176 |
| 6,782,474 B1 * | 8/2004 | Ylonen ....................... 713/162 |
| 6,792,323 B2 * | 9/2004 | Krzyzanowski et al. ....... 700/90 |
| 6,801,920 B1 * | 10/2004 | Wischinski ................. 707/203 |
| 6,901,316 B1 * | 5/2005 | Jensen et al. ................ 700/286 |
| 7,103,511 B2 * | 9/2006 | Petite ........................ 702/188 |
| 7,130,895 B2 * | 10/2006 | Zintel et al. ................. 709/220 |
| 7,133,907 B2 * | 11/2006 | Carlson et al. .............. 709/220 |
| 7,184,848 B2 * | 2/2007 | Krzyzanowski et al. ....... 700/90 |
| 2002/0027504 A1 * | 3/2002 | Davis et al. ................. 340/540 |

* cited by examiner

*Primary Examiner*—Tim T Vo
*Assistant Examiner*—Dangelino N Gortayo
(74) *Attorney, Agent, or Firm*—Cantor Colburn LLP

(57) ABSTRACT

A system includes a network and a producer device in communication with the network. The producer device includes instructions to transmit a data sample to a consumer device via the network and to receive a request from the consumer device to send configuration information. The configuration information relates to the data sample. The producer device also includes instructions to transmit the configuration information to the consumer device via the network. A method includes transmitting a data sample from a producer device to a consumer device via a network, receiving a request at the producer device to send configuration information to the consumer device, and transmitting the configuration information to the consumer device via the network. A computer program product includes a storage medium readable by a processing circuit and storing instructions for execution by the processing circuit for performing a method, which includes transmitting a data sample from a producer device to a consumer device via a network, receiving a request at the producer device to send configuration information to the consumer device, and transmitting the configuration information to the consumer device via the network.

24 Claims, 5 Drawing Sheets

APPARATUS AND METHOD FOR SHARING CONFIGURATION DATA AMONG A PLURALITY OF DEVICES

BACKGROUND OF THE INVENTION

This invention relates to networked devices in general and, more particularly, to the sharing of configuration information among a plurality of devices.

It is often desirable for systems to share data among a plurality of individual devices. However, in many cases, a given piece of data, known as a variable, is needed by some but not all of the devices in a networked system. A device is said to produce a variable if it makes the variable's value available to another device. A device is said to consume a variable if it obtains the variable's value from another device and uses it in some way, such as by using the value in a computation, by using the value to affect some control function, or by displaying the value to a human. Some variables may be produced by a single device and consumed by one or more device(s), while other devices may produce several variables that are each consumed by many different devices. For each variable, the producer and consumer(s) must agree on the configuration of the variable for the variable's value to be successfully transferred and used by each device. The configuration of the variable may comprise the data type, encoding, location, and the array length of the variable, and/or any other necessary information. Various methods exist for sharing configuration information between devices.

Typically, a centralized configuration store is created such that the needed configuration information is available globally. Systems that desire to be highly reliable cannot tolerate the failure point of a centralized store. Additionally, geographic and environmental considerations may preclude the necessary network connection to a centralized store. A programmable logic controller ("PLC"), for example, is typically configured by using a programming tool that is often located on a laptop computer. The laptop downloads the configuration to the PLC via a network connection or a direct, dedicated serial line. Neither the PLC nor the laptop is able to consistently maintain a network connection to any other device, such as a centralized configuration store, because of physical limitations. This is particularly true in an industrial environment, where electrical noise or in-progress construction creates an unstable environment.

Even if the environment can support a centralized configuration store, a PLC is not generally equipped to access the centralized configuration store. Typically, the laptop computer is used to access the centralized configuration store, and it is responsible for downloading any configuration changes to the PLC and for informing the centralized store of those changes. The centralized configuration store might fail to update its copy of the configuration due to an internal or network error or because the centralized store is not operational at the particular moment. Finally, even if both the PLC and the centralized store are each initially updated correctly with the proper information, a subsequent failure of the centralized store can cause loss of data. Any of these failures causes the two configurations to become different, precluding the useful transfer of subsequent data samples.

The potential for failure when attempting to transmit the same configuration information to a single device and a to centralized configuration store is compounded for each device. Since each consuming device must understand at least some of the configuration of the producer, the potential for failure is increased with each additional consumer. Each time the configuration of the producer is changed, the centralized store and each consumer must be updated with the new configuration information. If the configuration is changed at the producer but is not updated in the centralized store, the system will fail. If each consumer is not able to retrieve data from the centralized store, the system will fail. Consumers, such as PLCs, which are unable to initiate communication with the centralized configuration store require a third party, such as a laptop computer, to retrieve the configuration information from the store and download it to each consumer. Most systems require that a human remember to download the configuration information for each consumer individually. The system is typically unusable during the period of time that is required for all the updates to occur.

Systems that must be highly reliable and that must continue to operate even as changes are made cannot tolerate the potential for failure that is introduced by the centralized server and by the resulting need to keep the configuration information synchronized across the server and many devices.

The above problem is more easily described by pointing out a specific product, such as a PLC, that is constrained by the distributed nature of its use. The problem, however, is general in nature and exists in many distributed systems.

BRIEF DESCRIPTION OF THE INVENTION

Exemplary embodiments of the invention include a system for sharing configuration information among a plurality of devices. A system includes a network and a producer device in communication with the network. The producer device includes instructions to transmit a data sample to a consumer device via the network and to receive a request from the consumer device to send configuration information. The configuration information relates to the data sample. The producer device also includes instructions to transmit the configuration information to the consumer device via the network.

Exemplary embodiments also include a method for sharing configuration information among a plurality of devices. The method includes transmitting a data sample from a producer device to a consumer device via a network, receiving a request at the producer device to send configuration information to the consumer device, and transmitting the configuration information to the consumer device via the network. The configuration information relates to the data sample.

Exemplary embodiments further include a computer program product for sharing configuration information among a plurality of devices. The computer program product includes a storage medium readable by a processing circuit and storing instructions for execution by the processing circuit for performing a method, which includes transmitting a data sample from a producer device to a consumer device via a network, receiving a request at the producer device to send configuration information to the consumer device, and transmitting the configuration information to the consumer device via the network. The configuration information relates to the data sample.

Other systems, methods and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

Figure 1:
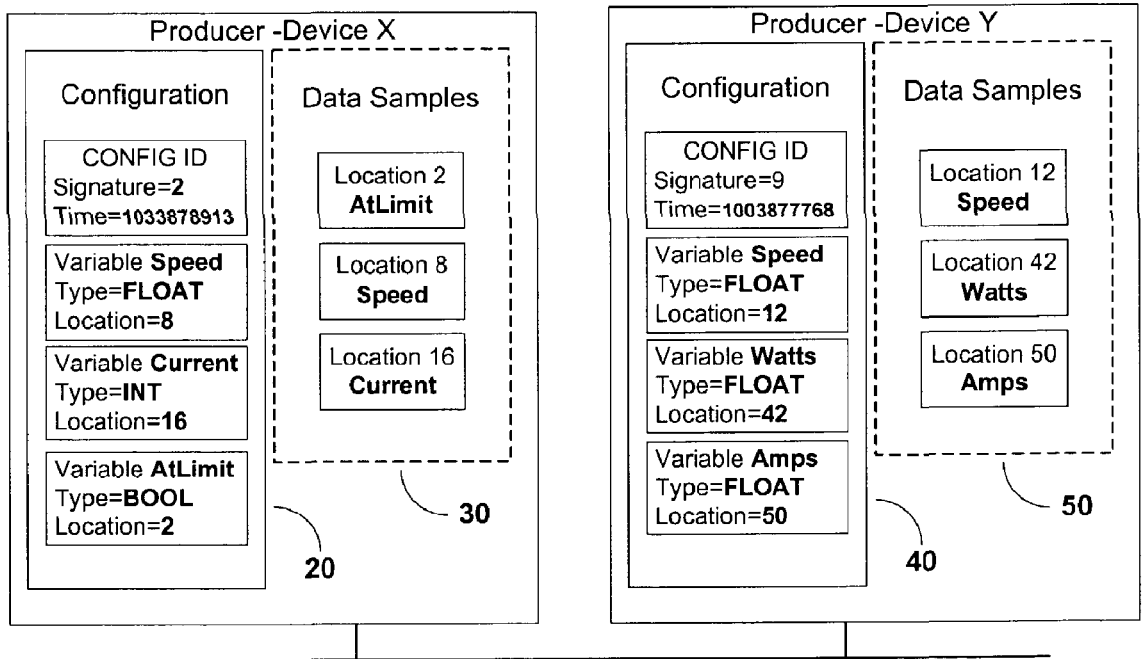
FIG. 1 is a block diagram of an exemplary embodiment of the disclosed apparatus for maintaining configuration information among multiple control devices.
Figure 1:
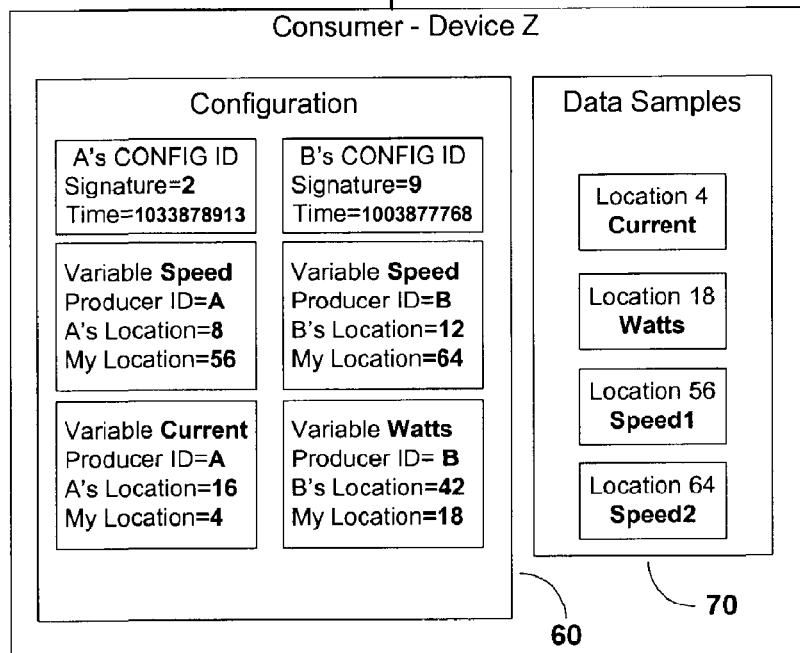

FIG. 1 is a block diagram depicting an exemplary embodiment for sharing and maintaining configuration information among a plurality of devices on a communication network. More specifically, FIG. 1 shows system 10 including devices X, Y, and Z which are coupled together via network 15. Network 15 includes any type of known network, including but not limited to, a wide area network ("WAN"), a local area network ("LAN"), a global network (e.g., the Internet), a virtual private network ("VPN"), an Ethernet LAN with internet protocol, and an intranet. The network may be implemented using a wireless network on any kind of physical network implementation for allowing communication between devices.

Devices X and Y are each producer devices, meaning that they provide data to others. Device Z consumes data from both X and Y. Any particular device may be a producer, a consumer, or simultaneously both. Each of the devices may or may not be located at the same geographical location.

Device X contains configuration information 20 regarding the configuration of data 30 that it is able to produce. In an exemplary embodiment, the data samples 30 include the variables Speed, Current, and AtLimit. Configuration information 20 of Device X includes the data type, encoding, array length, and the location of the data sample 30. The data type includes, but is not limited to, Boolean, Long Integer, Short Integer, Floating Point, and Double Precision Floating Point. The encoding converts the bits into a number or letter. The array length is how many distinct samples are being shared under the same name and location and is where in the message the numbers constituting the samples can be found.

Some of these configuration attributes (the data type, encoding, array length, and the location) may be omitted or a default value may be included if both the producer and consumer implicitly assume some value. For example, devices in a particular embodiment may assume that arrays are not supported and therefore omit the array length or may assume that all variables are Boolean and therefore omit the data type. In other embodiments, devices will assume the encoding is big endian or is little endian or is some other known encoding such as IEEE 754 floating point format.

As shown, configuration information 20 illustrates the name of each variable available and the location information needed by the consumer to find the value of each particular variable. The location information is relative to the protocol used for the data transfer of the values and may or may not be related to physical memory locations in the producer itself. Device Y contains configuration information 40 regarding data 50 that it is able to produce. This is similar in nature and construction to that provided by Device X.

In addition, the configuration information that is associated with each variable may often be more extensive than that shown in the diagrams. The disclosed invention is capable of dealing with any of the configuration information associated with variables, including but not limited to, such as data size, data type, array length, array element index, cardinality, offset, and address. Configuration information also includes information intended for interpretation or display, such as set-point limits, display limits, alarm limits, conversion information, or dead-band settings. In fact, arbitrary configuration information can be supported in any particular embodiment. The disclosed invention is also capable of performing well when object oriented data is used, since such data represents a hierarchical organization of the same type of data.

In one embodiment, both Device X and Device Y are able to maintain a variable named Speed. While it is possible that both devices may provide access to the same data, the variable names used are unique within Device X or Device Y, but need not be unique across the system as a whole, although system uniqueness is possible. Thus, in another embodiment, Device X can have a variable that Device X names Speed and Device Y can have a different variable that Device Y names Speed.

Device X and Device Y each have a CONFIG ID that identifies the configuration used by the producing device. Each CONFIG ID has a signature number, which is incremented any time the configuration is changed, and an absolute time stamp that indicates the time at which that configuration was defined or established. The CONFIG ID is made available to each consumer along with the data samples themselves. The CONFIG ID may also be sent separately from the data samples.

Device Z contains configuration information 60 regarding the data that it obtains from producers. This data is organized as variables, and the producer ID that supplies each variable is associated with that variable. The format of the producer ID is relative to the protocol used for the actual data transfer. In one embodiment using a typical TCP/IP or UDP/IP based protocol, the ID would typically be stored as the IP Address of the producing device, or alternatively as another ID that could be resolved to the IP Address. Device Z contains the location information used to access variables from producer(s) via the protocol. Additionally, Device Z contains location information used to transfer data samples 70 locally upon consumption. Local data 70 need not be named the same in the consuming device as it is in each producer, although that is certainly possible.

Device Z stores a copy of the CONFIG ID from each producer from which Device Z consumes data. This information may initially have been explicitly provided to device Z by outside means, such as a laptop computer, or might have been provided by each producing device itself at the request of Device Z.

In one embodiment, Device Z obtains data samples from producing Devices X and Y either at some periodic rate or whenever Device Z determines, by programming or by the nature of its mission, that the data is required. In another embodiment, Device Z also obtains the CONFIG ID information from the producing device whenever a data sample is obtained or, if permissible due to the nature of its mission, at some slower rate. Device Z compares the newly obtained CONFIG ID to its internal copy before using the data samples obtained. If the CONFIG ID obtained matches the local copy, Device Z is able to reliably use the data samples. If the newly obtained CONFIG ID differs from that obtained with the data sample, Device Z is unable to use the data sample, since the location of the values of each variable of the sample are in doubt. The mismatch in CONFIG ID information is an indication that the configuration of the producing device has changed and that the location information associated with the data samples used by Device Z may have changed as well.

If Device Z detects a mismatch in the CONFIG ID obtained from a producer versus the one internally held, Device Z initiates communication with the producing device, requesting new configuration information. The producing device responds with the configuration information, including the location of each variable as well as with the CONFIG ID that corresponds to the particular version of this configuration information. For each variable supplied by the producing device and required by Device Z, Device Z finds the configuration information among that supplied by the producer by using the variable name, as given by the producer. Device Z then updates the location information for each variable. Finally, Device Z stores the new CONFIG ID associated with the configuration information and is once again able to consume data from the producer. If any particular variable is no longer available from the producer, Device Z declares a fault for that variable and takes action as appropriate for its mission.

In another embodiment, consumers adapt to changes in producer devices so that over time, producers may add or move variables without ill effect. Producers may even remove variables, provided that attention is paid to proper sequencing. For example, if Device X wanted to produce data for a variable Voltage instead of Current, it would first produce data for both Voltage and Current. Device Z would then be reprogrammed to depend upon the Voltage data instead of the Current data. Finally, the Current variable could be removed from the configuration of Device X.

If the consumer does not detect a configuration mismatch until the mismatch actually occurs, the consumer may not have sufficient time to acquire new configuration information. The consuming device may thus be unable to perform its normal mission until the new configuration information is obtained, however, the dynamic binding process disclosed avoids this potential problem. FIGS. 2 through 5 illustrate not only a detailed example of the method thus far described, but also illustrate the dynamic binding process.

Figure 2:
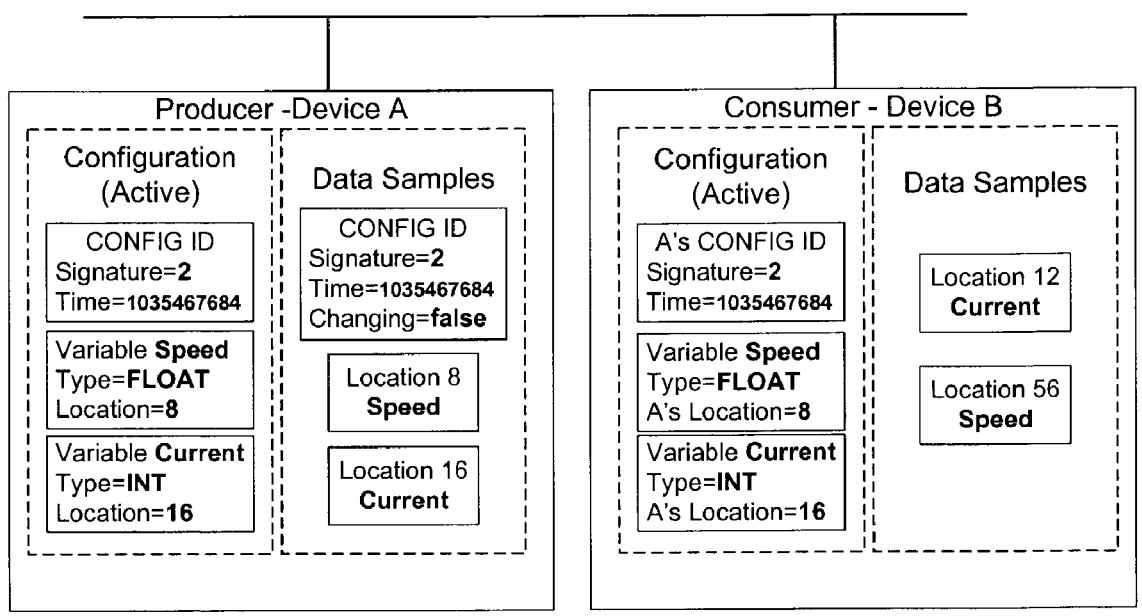
FIG. 2 is a state transfer diagram that shows both a producer and a consumer in a stable state before the dynamic binding process.

FIG. 2 depicts a system utilizing dynamic binding with Devices A and B in a stable state. In this embodiment, Device A produces data values for variables Speed and Current that are consumed by Device B. The CONFIG ID provided to consuming Device B contains not only the unique identifying information, but also includes an indication of the intent of configuration change.

Figure 3:
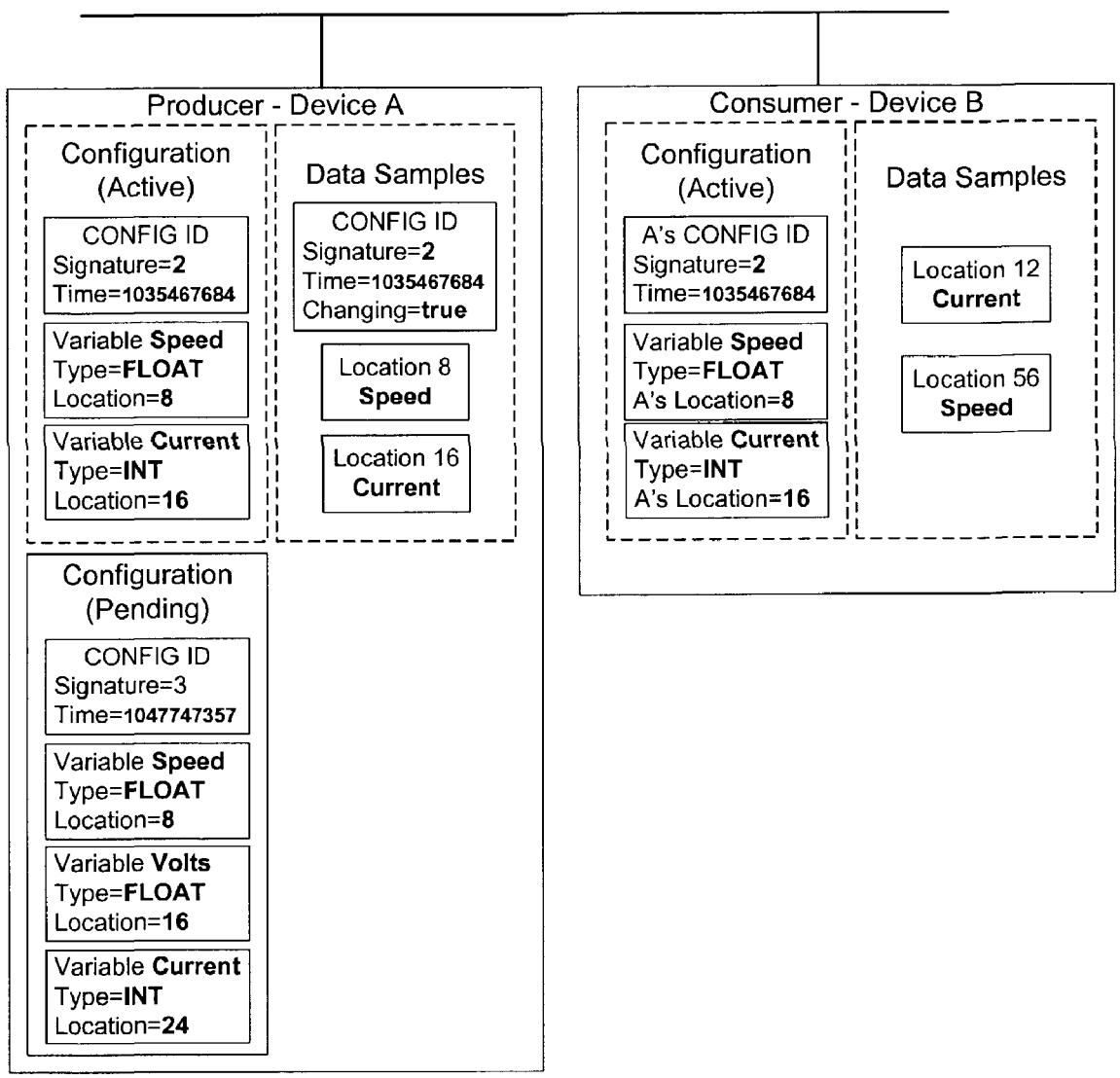
FIG. 3 is a state transfer diagram that shows both a producer and a consumer in the first stage of the dynamic binding process.

FIG. 3 depicts a system utilizing dynamic binding where Device A has, by external means, been instructed to change its configuration. The change in configuration requires Device A to move the variable Current to a new location. The new configuration is identified by a Signature value of 3 and has a new time stamp. Upon being instructed to change to this configuration, Device A indicates to Device B, and any other consumers, that a configuration change is about to occur by setting to true the changing flag of the CONFIG ID made available to consumers. Device A maintains the state shown in FIG. 3 for some pre-selected period of time or until some predetermined condition.

Figure 4:
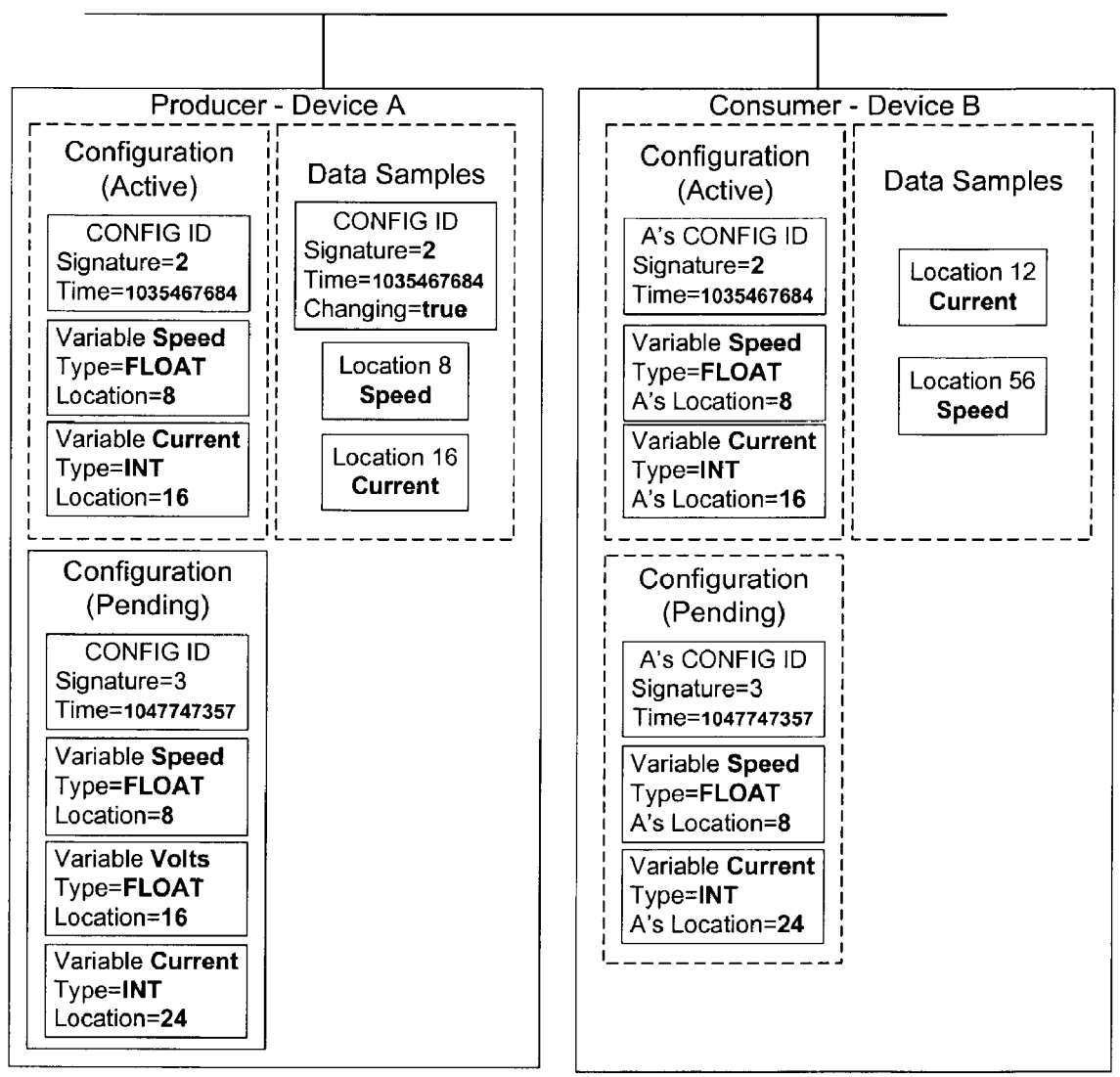
FIG. 4 is a state transfer diagram that shows both a producer and a consumer in the second stage of the dynamic binding process.

FIG. 4 depicts a system utilizing dynamic binding where consuming Device B has reacted to the indication of a pending change by requesting updated configuration information from Device A. Device A has provided that information, which Device B has stored. As shown, Device B has also stored the CONFIG ID of the new configuration. However, at the point in time depicted in FIG. 4, both devices are still operating with the configuration associated with Signature 2. Both devices are prepared to start using the configuration associated with Signature 3.

Figure 5:
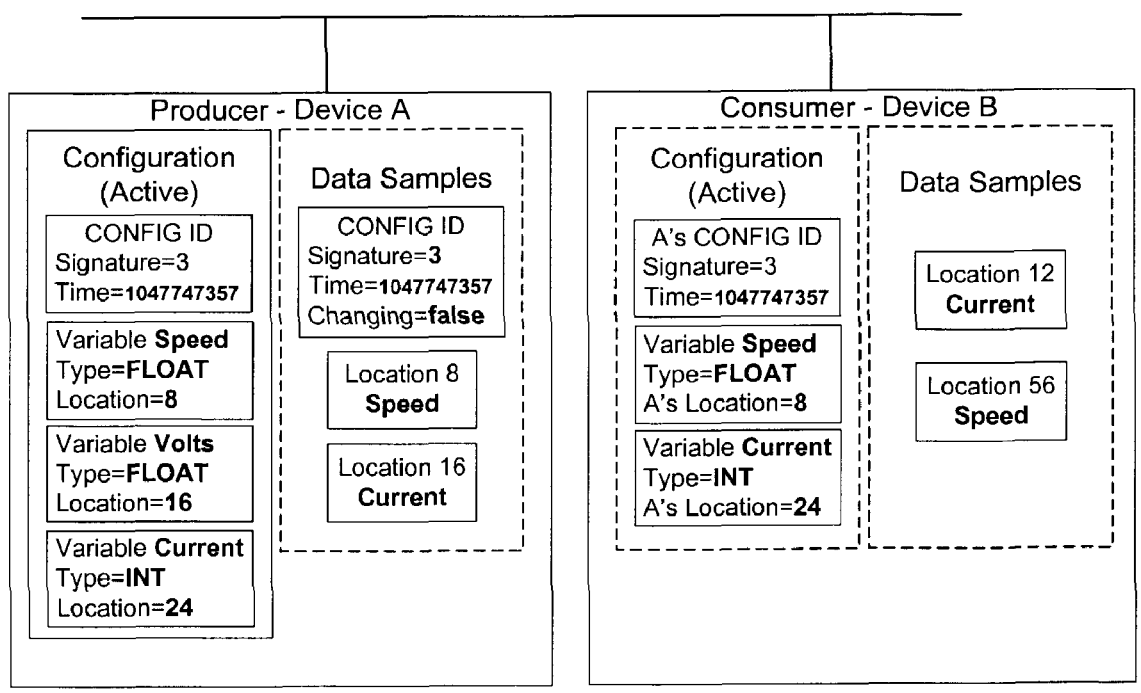
FIG. 5 is a state transfer diagram that shows both a producer and a consumer in a stable state after the dynamic binding process.

After the pre-selected period of time elapses or the predetermined condition occurs, Device A discards the old configuration and switches to the new configuration, associated with Signature 3. Device B responds to the change in the CONFIG ID information supplied by Device A by switching to the new configuration and discarding the old configuration. The system is once again in a stable state, as shown in FIG. 5.

The dynamic binding method, which is described above and uses a feed forward mechanism, namely that provided by the CONFIG ID Changing indication, allows the consuming device to instantaneously switch to the updated configuration with no loss of operation. While the dynamic binding method has been described by way of the example, other examples are possible.

Exemplary embodiments of the invention may be utilized to avoid the failures associated with the method of using a centralized configuration information store. As with any distributed system, network failures might prevent two devices from communicating. However, a consuming device is unable to perform its mission if the data samples from the producer are not available, so the loss of configuration information caused by the network failure is of no consequence. Since the same network path is used to provide both data sample and configuration information, it is highly unlikely that the configuration path will fail unless the data path has also failed, rendering the configuration information irrelevant.

Exemplary embodiments of the invention may also be utilized to reduce overall system costs because the configuration information is provided in a timely and effective manner. In addition, exemplary embodiments of the invention provide a mechanism in which configuration information is updated when the consumer device is ready to receive the configuration information.

Exemplary embodiments of the invention include a system of PLCs wherein the controllers communicate with each other and share data with each other under a predetermined communications protocol. More specifically, the plurality of programmable controllers includes one or more producer controllers and one or more consumer controllers. The system further includes a communications network connecting the producer controller(s) to the consumer controller(s). A given producer controller obtains a data sample and provides the data sample to the consumer(s). It does not matter if the producer sends the data sample to the consumers or if the consumers request the data sample from the producer. A predetermined communications protocol allows the consumer to request the configuration information from the producer and for the producer to supply that information to the consumer upon request. The consumer is thus able to detect a configuration mismatch and correct the problem by getting configuration information directly from the producer.

It is noted that the disclosed system supports a high reliability system by placing the responsibility of providing the configuration information on the producer as opposed to the normal technique of placing the configuration information in a separate centralized data store. Additionally, the disclosed system supports a high reliability system by burdening the consumer with the task of detecting and updating invalid or out of date configuration information instead of the typical technique of placing this burden on a third party.

Embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for sharing configuration information among a plurality of devices, the system comprising:
   a network;
   a plurality of consumer devices in communication with the network; and
   a plurality of producer devices in communication with the network the plurality of producer devices able to communicate with the plurality of consumer devices via the network, each of the plurality of producer devices including an active configuration information protocol having an active incrementable CONFIG ID corresponding to an active data that is independent of configuration information protocol of other producer devices without a common database of configuration information protocol or a central configuration information repository that when provided to one of the plurality of consumer devices allow the receiving consumer device to properly configure the corresponding active data received from the producer device from which the configuration information protocol was received, one of the plurality of producer devices having configuration information that can be different than the configuration information in another of the plurality of producer devices, the consumer device configured to compare the active incrementable CONFIG ID to a previously obtained incrementable CONFIG ID that corresponds to a previously obtained configuration information protocol, each of the plurality of consumer devices able to automatically request the active configuration information protocol from one of the plurality of producer devices in response to a mismatch between the active incrementable CONFIG ID and the previously obtained incrementable CONFIG ID detectable by the consumer, the one of the plurality of the producer devices being responsive to the request without alteration of data or configuration information produced from the one of the plurality of producer devices.

2. The system of claim 1, wherein configuration information protocol includes one or more of data type, encoding, location, array length a signature, a time stamp, data size, an away element index, cardinality, an offset, and an address of a data sample.

3. The system of claim 1, wherein configuration information protocol includes default values.

4. The system of claim 1, wherein configuration information protocol includes a first configuration and a second configuration, the second configuration being unique in comparison to configurations of all other producer devices, the producer device transmits the data sample having the first configuration and a version of the first configuration and at least one of an indication that the second configuration is pending and a version of the second configuration.

5. The system of claim 4, wherein the producer device receives a request from the consumer device to send the configuration information protocol in response to the at least one of the indication that the second configuration is pending and the version of the second configuration.

6. The system of claim 1, wherein configuration information protocol includes a first configuration and a second configuration, the second configuration being unique in comparison to configurations of all other producer devices, the producer device transmits at least one of the data sample having the first configuration, a version of the first configuration, an indication that the second configuration is pending, and a version of the second configuration.

7. The system of claim 6, wherein the producer device receives a request from the consumer device to send the configuration information protocol in response to the at least one of the indication that the second configuration is pending and the version of the second configuration.

8. The system of claim 1, wherein the consumer device detects a mismatch in the CONFIG ID via the network.

9. The system of claim 1, wherein the producer device receives an instruction from external source to change configuration information protocol from a first configuration to a second configuration.

10. The system of claim 1, wherein the producer device instructs the consumer device via the network that a change in configuration information protocol is pending.

11. The system of claim 10, wherein the producer device maintains a first configuration for a predetermined time and creates a second configuration.

12. The system of claim 11, wherein the producer device transmits the second configuration to the consumer device.

13. The system of claim 12, wherein the producer device implements the second configuration and the consumer device responds and implements the second configuration.

14. The system of claim 1, wherein the network includes at least one of an local area network, a wide area network, a global network, a virtual private network, an intranet, an Ethernet local area network with internet protocol.

15. A method for sharing configuration information among a plurality of devices, the method comprising:
transmitting a active incrementable CONFIG ID from a producer device to a consumer device via a network;
comparing the active incrementable CONFIG ID and a previously obtained incrementable CONFIG ID that was previously obtained by the consumer;
detecting a mismatch between the active incrementable CONFIG ID and the previously obtained CONFIG ID;
receiving a request at the producer device from the consumer device when a mismatch is detected by the consumer device to send an active configuration information to the consumer device, the active configuration information relating to an active data sample; and
automatically transmitting the active configuration information, without modifying the configuration information as a result of the request, stored in the producer device that is independent of configuration information stored in any other producer device and that is not from a common database of configuration information or a central configuration repository from the producer device to the consumer device via the network in response to receiving the request from the consumer device.

16. The method of claim 15, further comprising receiving an instruction at the producer device to change configuration information from a first configuration to a second configuration.

17. The method of claim 16, instructing the consumer device via the network that the change in configuration information is pending.

18. The method of claim 16, further comprising maintaining the first configuration at the producer device for a predetermined time and creating the second configuration at the producer device.

19. The method of claim 18, further comprising transmitting the second configuration to the consumer device.

20. The method of claim 19, further comprising implementing the second configuration at the producer device.

21. The method of claim 20, further comprising implementing the second configuration at the consumer device in response to the producer device implementing the second configuration.

22. A computer program product for sharing configuration information among a plurality of devices, the computer program product comprising:
a storage medium readable by a processing circuit and storing instructions for execution by the processing circuit for performing a method comprising:
transmitting a active incrementable CONFIG ID from a producer device to a consumer device via a network;
comparing the active incrementable CONFIG ID and a previously obtained incrementable CONFIG ID that was previously obtained by the consumer;
detecting a mismatch between the active incrementable CONFIG ID and the previously obtained CONFIG ID;
receiving a request at the producer device from the consumer device when a mismatch is detected by the consumer device to send the active configuration information to the consumer device, the active configuration information relating to an active data sample; and
automatically transmitting the active configuration information stored in the producer device, without modifying the configuration information as a result of the request, the configuration information being independent of configuration information stored in any other producer device and that is not from a common database of configuration information or a central configuration repository from the producer device to the consumer device via the network in response to receiving the request from the consumer device.

23. The system of claim 1, wherein configuration information protocol is stored in the producer device.

24. The system of claim 1, wherein an incrementable CONFIG ID is time stamped.

* * * * *